(12) United States Patent
Kato et al.

(10) Patent No.: US 11,401,934 B2
(45) Date of Patent: Aug. 2, 2022

(54) ROTARY DISPLACEMENT COMPRESSOR HAVING A CHECK VALVE AND A BACKFLOW CONTROL VALVE ARRANGED IN SERIES THROUGH A DISCHARGE PIPE

(71) Applicant: Hitachi Industrial Equipment Systems Co., Ltd., Tokyo (JP)

(72) Inventors: Fuminori Kato, Tokyo (JP); Yoshiyuki Kanemoto, Tokyo (JP); Hiroaki Saito, Tokyo (JP); Akihiro Yamamoto, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 107 days.

(21) Appl. No.: 16/475,572

(22) PCT Filed: Jan. 31, 2017

(86) PCT No.: PCT/JP2017/003472
§ 371 (c)(1),
(2) Date: Jul. 2, 2019

(87) PCT Pub. No.: WO2018/142486
PCT Pub. Date: Aug. 9, 2018

(65) Prior Publication Data
US 2019/0338773 A1    Nov. 7, 2019

(51) Int. Cl.
*F03C 2/00* (2006.01)
*F03C 4/00* (2006.01)
(Continued)

(52) U.S. Cl.
CPC .......... *F04C 18/02* (2013.01); *F04C 18/0215* (2013.01); *F04C 28/04* (2013.01);
(Continued)

(58) Field of Classification Search
CPC .... F04C 18/02; F04C 18/0215; F04C 23/008; F04C 28/04; F04C 28/125; F04C 28/14;
(Continued)

(56) References Cited

U.S. PATENT DOCUMENTS 2,682,281 A * 6/1954 Ecker ...................... F16K 15/04
137/533.13
4,663,578 A * 5/1987 Iwasaki ..................... H02P 3/18
318/762
(Continued)

FOREIGN PATENT DOCUMENTS

| CN | 101707464 A | 5/2010 |
| CN | 103797705 A | 5/2014 |

(Continued)

OTHER PUBLICATIONS

JP2014-009625A—Kiso et al.—Electric Compressor—Jan. 20, 2014—the English Translation (Year: 2014).*
(Continued)

*Primary Examiner* — Theresa Trieu
(74) *Attorney, Agent, or Firm* — Crowell & Moring LLP

(57) ABSTRACT

An object of the present invention is to provide a rotary displacement compressor capable of determining whether a check valve has failed, and preventing the life of a compressor body from being reduced when a compression operation stops. In order to achieve the object, a rotary displacement compressor includes a compressor body that compresses a medium by reducing a volume of the medium using rotation; a discharge pipe through which a compressed medium, which is discharged through a discharge port of the compressor body, flows; a check valve that shuts off the compressed medium flowing backward to the compressor body; and a backflow control valve that allows a predetermined rate of the compressed medium to flow backward.

(Continued)

The check valve and the backflow control valve are disposed in series via the discharge pipe.

6 Claims, 3 Drawing Sheets

(51) Int. Cl.
  *F04C 2/00* (2006.01)
  *F04C 15/00* (2006.01)
  *F04C 18/02* (2006.01)
  *F04C 28/04* (2006.01)
  *F04C 28/12* (2006.01)
  *F04C 28/14* (2006.01)
  *F04C 28/28* (2006.01)
  *F16J 15/16* (2006.01)
  *F04C 29/04* (2006.01)

(52) U.S. Cl.
  CPC ............ *F04C 28/125* (2013.01); *F04C 28/14* (2013.01); *F04C 28/28* (2013.01); *F04C 29/04* (2013.01); *F16J 15/164* (2013.01)

(58) Field of Classification Search
  CPC .......... F04C 28/24; F04C 28/28; F04C 29/04; F04C 2210/221; F04C 2240/403; F04C 2270/72
  See application file for complete search history.

(56) References Cited

U.S. PATENT DOCUMENTS

| | | | | |
|---|---|---|---|---|
| 5,358,387 | A * | 10/1994 | Suzuki | F04C 18/0215 418/55.1 |
| 7,237,569 | B2 * | 7/2007 | Shieh | F16K 15/04 137/533.13 |
| 7,442,239 | B2 * | 10/2008 | Armstrong | B01D 46/4263 55/315.1 |
| 7,607,319 | B2 * | 10/2009 | Okamoto | F04C 29/126 418/270 |
| 2008/0178948 | A1 | 7/2008 | Wilmshurst et al. | |
| 2009/0085312 | A1 | 4/2009 | Mori et al. | |
| 2009/0230903 | A1 * | 9/2009 | Yamamoto | H02P 27/04 318/801 |
| 2013/0045113 | A1 | 2/2013 | Foye et al. | |
| 2014/0361612 | A1 | 12/2014 | Magne et al. | |
| 2016/0003246 | A1 * | 1/2016 | Mizufune | F04C 18/0215 418/55.1 |

FOREIGN PATENT DOCUMENTS

| | | |
|---|---|---|
| CN | 104024026 A | 9/2014 |
| CN | 104235441 B | 8/2016 |
| EP | 0 863 313 A1 | 9/1998 |
| JP | 49-42891 Y1 | 11/1974 |
| JP | 4-101093 A | 4/1992 |
| JP | 7-139477 A | 5/1995 |
| JP | 11-182480 A | 7/1999 |
| JP | 11-303778 A | 11/1999 |
| JP | 2004-332556 A | 11/2004 |
| JP | 2009-85105 A | 4/2009 |
| JP | 2009-180178 A | 8/2009 |
| JP | 2009-85105 A5 | 11/2010 |
| JP | 2014-9625 A | 1/2014 |
| WO | WO 2015/031961 A2 | 3/2015 |

OTHER PUBLICATIONS

JP11-182480A—Sato et al.—Rotary Compressor—Jul. 6, 1999—the Machine English Translation. (Year: 1999).*
Japanese-language Office Action issued in Japanese Application No. 2018-565125 dated Apr. 28, 2020 with English translation (eight pages).
International Search Report (PCT/ISA/210) issued in PCT Application No. PCT/JP2017/003472 dated Apr. 25, 2017 with English translation (four (4) pages).
Japanese-language Written Opinion (PCT/ISA/237) issued in PCT Application No. PCT/JP2017/003472 dated Apr. 25, 2017 (four (4) pages).
Japanese-language Office Action issued in Japanese Application No. 2018-565125 dated Jan. 28, 2020 with English translation (eight (8) pages).
Chinese-language Office Action issued in Chinese Application No. 201780082044.5 dated Mar. 9, 2020 with partial English translation (13 pages).
Hindi-language Office Action issued in Indian Application No. 201917026686 dated Jun. 9, 2020 with English translation (five pages).
European Communication pursuant to Article 94(3) EPC issued in European Application No. 17 895 137.2 dated Apr. 22, 2021 (three (3) pages).
Extended European Search Report issued in European Application No. 17895137.2 dated Aug. 4, 2020 (seven (7) pages.

* cited by examiner

ROTARY DISPLACEMENT COMPRESSOR HAVING A CHECK VALVE AND A BACKFLOW CONTROL VALVE ARRANGED IN SERIES THROUGH A DISCHARGE PIPE

TECHNICAL FIELD

The present invention relates to a rotary displacement compressor that compresses a medium by reducing the volume of the medium using rotation of scrolls and the like.

BACKGROUND ART

A compressor includes a displacement type that performs compression by reducing the volume of a medium, and a centrifugal type that performs compression using centrifugal force. The displacement compressor is divided into a rotary displacement compressor that performs compression by reducing the volume of a medium using rotation of scrolls and the like, and a reciprocating displacement compressor that performs compression using reciprocating motions of a piston. A scroll type compressor, a screw type compressor, and the like are known as the rotary displacement compressor.

Generally, the rotary displacement compressor, if being used as an air compressor for compressing air, has a configuration in which air compressed in a compression chamber inside a compressor body is discharged to an outside air tank through a discharge port and a discharge pipe. In the related art, the rotary displacement compressor has the problem that when the compressor stops operating, the compressed air in the air tank flows backward into the compression chamber of the compressor body, and rotary parts rotate reversely, thereby causing noise to occur. In order to solve the problem, there is known a method of preventing the backflow of compressed air by providing a check valve between the discharge port of the compressor body and the air tank.

JP 11-182480 A (Patent Document 1) discloses the background art relating to the technical field. Patent Document 1 discloses a rotary compressor including a compressor body that compresses gas using rotary motions; an aftercooler that cools the gas compressed by the compressor body; and a tank that stores the compressed gas cooled by the aftercooler, in which a first check valve is provided between the compressor body and the aftercooler to allow the compressed gas to flow to the aftercooler, and to shut off a backflow, and in which a second check valve is provided between the aftercooler and the tank to allow the cooled compressed gas to flow from the aftercooler to the tank, and to shut off a backflow.

In addition, there is JP 7-139477 A (Patent Document 2). Patent Document 2 discloses a scroll type air compressor including a compressor body; and an air tank that stores compressed air discharged from the compressor body, in which a discharge path for connecting a discharge port of the compressor body to the air tank is provided with a check valve that allows the compressed air to flow from the compressor body to the air tank through the discharge port and prevents a backflow, flow speed regulating means that is provided bypassing the check valve and regulates the flow speed of the compressed air flowing backward from the air tank to the compressor body, and a switching valve that selectively switches a flow path between the check valve and the flow speed regulating means.

CITATION LIST

Patent Document

Patent Document 1: JP 11-182480 A
Patent Document 2: JP 7-139477 A

SUMMARY OF THE INVENTION

Problems to be Solved by the Invention

In Patent Document 1, when a compression operation stops, the first check valve is capable of preventing compressed air remaining between the compressor body and the tank from leaking and flowing backward to the compressor body. The second check valve is capable of preventing the compressed air in the tank from leaking and flowing backward to the compressor body. However, if the first and second check valves fail, experience malfunctions, and do not function properly, when a compression operation stops, an orbiting scroll may rotate at high speeds in a reverse direction relative to the direction of operation, and damage induced by centrifugal force may reduce the life of the compressor body, which is a problem. If only the second check valve experiences malfunctions, since the first check valve is capable of preventing the backflow of compressed air, it is not possible to determine that the second check valve has failed, which is a problem.

Patent Document 2 describes a technique in which when a compression operation stops, the compressed air in the air tank is regulated to flow backward to the compressor body and to remove dust or the like from a suction filter by the flow speed regulating means for regulating a flow speed. A throttle valve which is the flow speed regulating means is provided in parallel with the check valve, and the flow path is switched therebetween. Patent Document 2 describes the concept of positively utilizing the backflow of compressed air rather than preventing the backflow of compressed air when a compression operation stops.

Solutions to Problems

In an example of the present invention made in light of the background art and the problems, there is provided a rotary displacement compressor including a compressor body that compresses a medium by reducing a volume of the medium using rotation; a discharge pipe through which a compressed medium, which is discharged through a discharge port of the compressor body, flows; a check valve that shuts off the compressed medium flowing backward to the compressor body; and a backflow control valve that allows a predetermined rate of the compressed medium to flow backward. The check valve and the backflow control valve are disposed in series via the discharge pipe.

Effects of the Invention

According to the present invention, it is possible to provide the rotary displacement compressor capable of determining whether the check valve has failed, and preventing the life of the compressor body from being reduced when a compression operation stops.

MODE FOR CARRYING OUT THE INVENTION

Hereinbelow, an example of the present invention will be described with reference to the drawings.

Example 1

In the example, a scroll compressor which compresses air using a scroll type compressor will be described as an example of a rotary displacement compressor.

Figure 1:
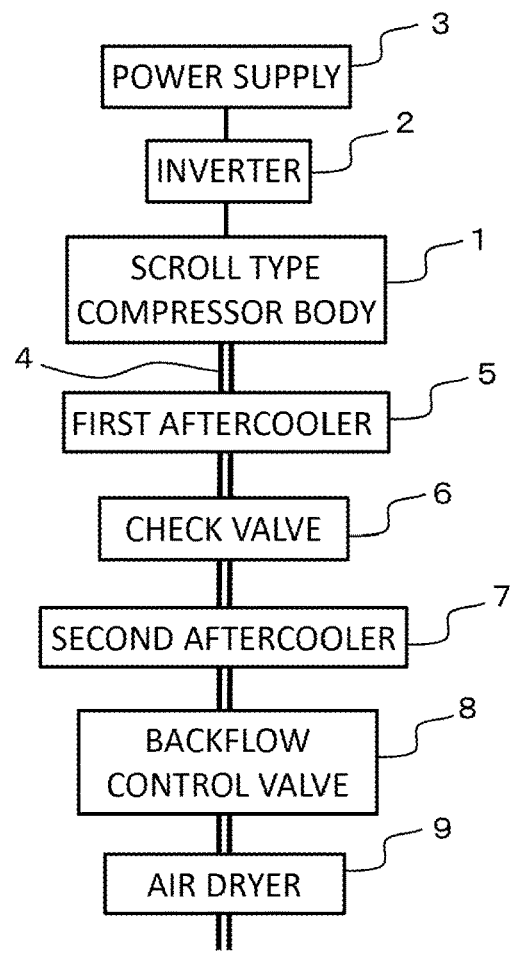
FIG. 1 is a block diagram illustrating the entire configuration of a scroll compressor in an example.

FIG. 1 is a block diagram illustrating the entire configuration of the scroll compressor in the example. In FIG. 1, 1 denotes a scroll type compressor body in which a compressor body is integrated with a motor driving the compressor body, 2 denotes an inverter having a control unit that inverter-controls the motor, 3 denotes a power supply, 4 denotes a discharge pipe that is connected to a discharge port for air compressed by the scroll type compressor body 1, 5 denotes a first aftercooler that cools high temperature compressed air discharged from the scroll type compressor body 1, 6 denotes a check valve that shuts off compressed air flowing backward from an air tank which is connected to the discharge pipe 4 and stores compressed air, 7 denotes a second aftercooler that further cools compressed air, 8 denotes a backflow control valve that allows a predetermined rate of backflow by limiting a flow rate without completely shutting off the backflow of compressed air, and 9 denotes an air dryer that reduces the humidity of compressed air. A discharge side of the air dryer 9 is connected to the air tank (not illustrated) via the discharge pipe 4.

The second aftercooler 7 or the air dryer 9 may be omitted. The check valve 6 and the backflow control valve 8 may be connected in the reverse order.

Figure 2:
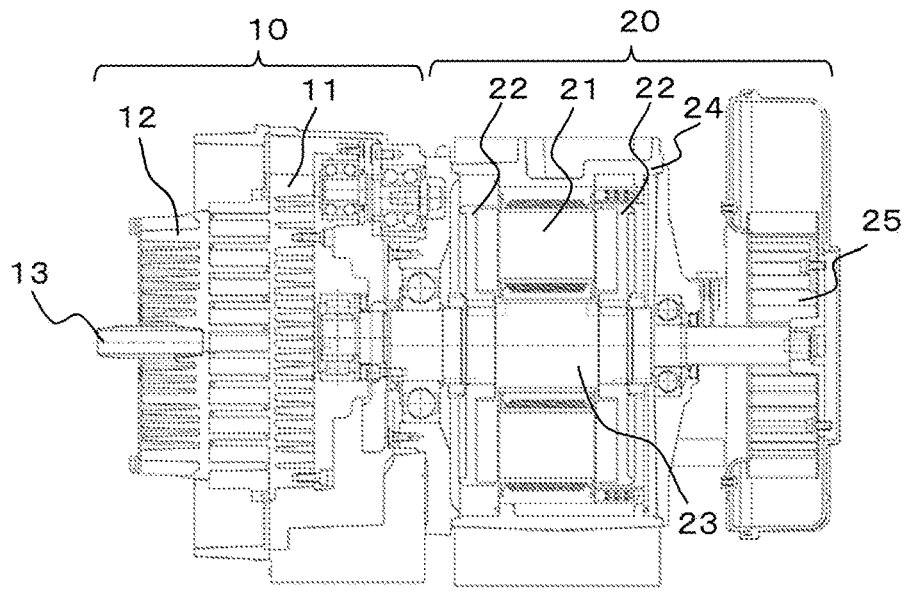
FIG. 2 is a transverse cross-sectional view of a scroll type compressor body in which a compressor body is integrated with a motor in the example.

FIG. 2 is a transverse cross-sectional view of the scroll type compressor body 1 in which the compressor body is integrated with the motor in the example. In FIG. 2, a motor is an axial gap type rotary motor, and a motor with one stator and two rotors is illustrated as the motor 20. A stator 21 is disposed at and fixed to an axial central portion of a shaft 23 in a motor casing 24. Two rotors 22 are disposed in such a manner that two rotors 22 face the stator 21 and interpose the stator 21 therebetween in an axial direction of the shaft 23. Since the motor 20 has a structure in which the rotors and the stator face each other in the axial direction, the motor 20 has an advantage that the axial length of the motor 20 can be shortened and the diameter of the motor can be reduced compared to a radial gap type motor. A cooling fan is denoted by 25.

A compressor body 10 includes an orbiting scroll 11 and a fixed scroll 12 as main components. The orbiting scroll 11 is driven to orbit by the shaft 23. Spiral wrap portions are erected on the orbiting scroll 11 and the fixed scroll 12, respectively, and a plurality of compression chambers are defined between the wrap portions of the orbiting scroll 11 and the fixed scroll in a position where the orbiting scroll 11 faces the fixed scroll 12. The orbiting scroll 11 performs compression by reducing the volumes of the compression chambers formed between the orbiting scroll 11 and the fixed scroll 12 as the center of the orbiting scroll 11 is approached. The discharge port for compressed air is denoted by 13.

The axial gap type rotary motor is a so-called permanent magnet (PM) motor in which the rotor 22 includes permanent magnets annularly disposed in a rotor yoke. Therefore, the scroll type compressor body 1 of the example illustrated in FIG. 2 is a scroll type compressor body directly driven by the PM motor. In the PM motor, it is necessary to align the polarities of magnetic fields with the polarities of magnetic poles, the rotation of the PM motor is generally controlled by an inverter, and it is necessary to prevent the occurrence of the step-out phenomenon that the number of revolutions recognized by the inverter does not coincide with an actual number of revolutions of the motor.

Subsequently, an operation of the scroll type compressor will be described with reference to FIG. 1. In the related art, a check valve is provided to solve the problem that if a compressor stops operating, compressed air in an air tank flows backward into a compression chamber of a compressor body, and rotary parts rotate reversely. However, if the backflow of compressed air cannot be shut off due to a failure of the check valve, when a compression operation stops, an orbiting scroll may rotate at high speeds in a reverse direction relative to the direction of operation, and damage induced by centrifugal force may reduce the life of the compressor body, which is a problem. In addition, if the PM motor rotates reversely, electromotive force may occur, and capacitors of the inverter 2 may explode, or the like, which is a problem. In the example, the backflow control valve 8 is connected in series to the check valve 6, and limits a flow rate while not completely shutting off the backflow of compressed air. Therefore, even though the backflow of compressed air cannot be shut off due to a failure of the check valve 6, since the rate of backflow is limited by the backflow control valve 8, a small rate of compressed air flows backward into the compression chambers of the compressor body, and the rotational speed of the orbiting scroll 11 in the reverse direction becomes low. For this reason, it is possible to resolve the problem such as damage being induced by centrifugal force, or the problem such as the capacitors of the inverter 2 exploding due to electromotive force. In addition, whether the check valve 6 has failed can be determined by detecting the reverse rotation of the orbiting scroll of the compressor body via the inverter 2. Specifically, it is possible to detect a failure of the check valve 6 by observing the voltage or the current of the motor.

As described above, when a compression operation stops, a reduction in the life of the compressor body can be prevented, and whether the check valve has failed can be determined by allowing a small rate of backflow while not completely shutting off the backflow of compressed air. A flow rate limitation of the backflow control valve 8 may be limited to, for example, one seventh of a maximum flow rate.

When a compression operation stops, since the backflow of compressed air is not completely shut off, compressed air remaining in the discharge pipe may flow backward into the compression chambers of the compressor body. For this reason, it is not necessary to provide the check valve in the vicinity of the discharge port of the compressor body, and it is possible to avoid deterioration of the check valve, which is induced by high temperature compressed air from the discharge port. That is, it is possible to avoid heat-induced deterioration of the check valve by disposing the check valve 6 behind the first aftercooler 5.

Figure 3A:
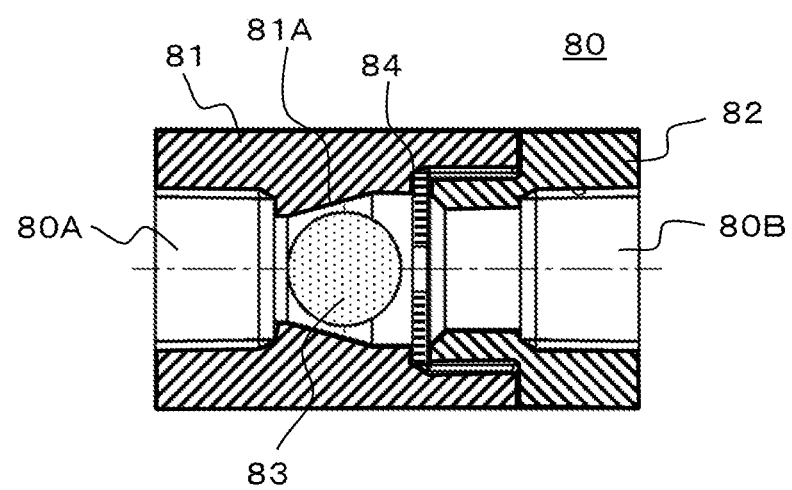
FIGS. 3A and 3B are configuration views of a ball type backflow control valve in the example.
Figure 3B:
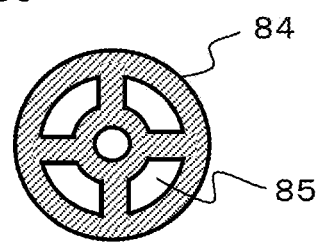

Subsequently, a specific example of the backflow control valve will be described. FIG. 3 is a configuration view of a ball type backflow control valve in the example. FIG. 3(A) is a transverse cross-sectional view, a ball type backflow control valve 80 includes a body 81; a cap 82; a ball 83; and a stopper 84. FIG. 3(B) is a front view of the stopper 84. As illustrated in FIG. 3(B), a hole 85 is provided in the stopper 84.

In FIG. 3(A), the ball type backflow control valve 80 has a configuration in which the ball 83 is provided capable of moving in the body 81, and when compressed air flows into an inlet port 80A, a movement of the ball 83 is limited by the stopper 84, and the compressed air is allowed to flow to an outlet port 80B through the hole 85 provided in the stopper 84. If compressed air flows in through the outlet port 80B, a movement of the ball 83 is limited by a tapered surface 81A of the body 81. If the tapered surface 81A is processed to have a coarse surface roughness, compressed air leaks to the inlet port 80A through a gap between the ball 83 and the tapered surface 81A. Therefore, it is possible to limit the flow rate of backflow. Instead of using the surface roughness of the tapered surface 81A, a groove may be provided in the tapered surface 81A, and thus limited compressed air may be allowed to flow therethrough.

Figure 4A:
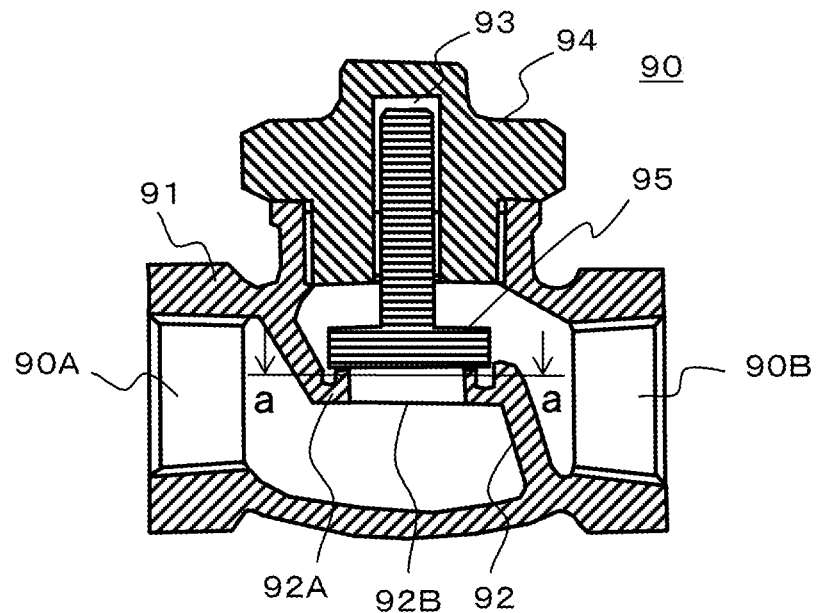
FIGS. 4A to 4C are configuration views of a disk valve-type backflow control valve in the example.

Another specific example of the backflow control valve will be described. FIG. 4 is a configuration view of a disk valve-type backflow control valve in the example. FIG. 4(A) is a longitudinal cross-sectional view. A disk valve-type backflow control valve 90 includes a valve case 91 provided with an inlet port 90A and an outlet port 90B; a partition wall 92 which forms part of the valve case 91, and is provided with a valve seat 92A and an opening 92B; a screw 94 which screws into a screw hole of the valve case 91, and in which a guide hole 93 is formed in an axial direction; and a disk valve 95 which is integrally formed as a stepped cylindrical member, and part of which is slidably inserted into the guide hole 93 of the screw 94.

Figure 4B:
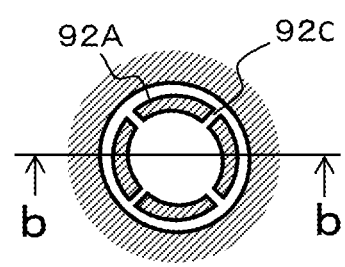

FIG. 4(B) is a front view of the valve seat 92A as seen from the direction of arrows a in FIG. 4(A). FIG. 4(A) is a cross-sectional view as seen from the direction of arrows b in FIG. 4(B). As illustrated in FIG. 4(B), the valve seat 92A has a groove 92C.

Figure 4C:
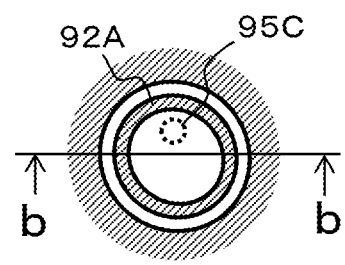

In FIG. 4(A), the disk valve-type backflow control valve 90 has a configuration in which when compressed air flows into the inlet port 90A, the disk valve 95 moves away from the valve seat 92A, and thus the compressed air is allowed to flow between the valve seat 92A and the disk valve 95 to the outlet port 90B. If compressed air flows in through the outlet port 90B, the disk valve 95 comes into close contact with the valve seat 92A, but due to the groove 92C being provided in the valve seat 92A, the compressed air leaks to the inlet port 90A through a gap between the disk valve 95 and the groove 92C. Therefore, it is possible to limit the flow rate of backflow. In addition, as illustrated in FIG. 4(C), if a hole 95C is provided in the disk valve 95 instead of providing a groove in the valve seat 92A, compressed air is allowed to escape to the inlet port 90A through the hole, and thus it is possible to obtain the same effects.

As described above, in the example, the rotary displacement compressor includes the compressor body that compresses a medium by reducing the volume of the medium using rotation; the discharge pipe through which a compressed medium, which is discharged through the discharge port of the compressor body, flows; the check valve that shuts off the compressed medium flowing backward to the compressor body; and the backflow control valve that allows the predetermined rate of the compressed medium to flow backward. The check valve and the backflow control valve are disposed in series via the discharge pipe.

As a result, since the backflow control valve, which limits a flow rate while not completely shutting off the backflow of compressed air, is connected in series to the check valve, when a compression operation stops, even though the check valve fails, a small rate of compressed air flows backward to the compressor body, and it is possible to prevent a reduction in the life of the compressor body, and to determine whether the check valve has failed.

The example has been described above; however, the present invention is not limited to the example, and may include various modification examples. For example, in the example, the scroll compressor, which compresses air using the scroll type compressor, has been described; however, the present invention is not limited to the scroll compressor, and may be applied to, for example, a screw type compressor.

REFERENCE SIGNS LIST

1 Scroll type compressor body
2 Inverter
3 Power supply
4 Discharge pipe
5 First aftercooler
6 Check valve
7 Second aftercooler
8 Backflow control valve
9 Air dryer
10 Compressor body
11 Orbiting scroll
12 Fixed scroll
13 Discharge port
20 Motor
21 Stator
22 Rotor
23 Shaft
24 Motor casing
25 Cooling fan
80 Ball type backflow control valve
80A Inlet port
80B Outlet port
81 Body
81A Tapered surface
82 Cap
83 Ball
84 Stopper
85 Hole
90 Disk valve-type backflow control valve
90A Inlet port
90B Outlet port
91 Valve case
92 Partition wall
92A Valve seat
92B Opening
92C Groove
93 Guide hole
94 Screw
95 Disk valve
95C Hole

The invention claimed is:

1. A rotary displacement compressor comprising:
a compressor body that compresses a medium by reducing a volume of the medium using rotation;
a discharge pipe through which a compressed medium, which is discharged through a discharge port of the compressor body, flows;

a check valve that shuts off the compressed medium flowing backward to the compressor body; and a backflow control valve that allows a predetermined rate of the compressed medium to flow backward, wherein the check valve and the backflow control valve are disposed in series via the discharge pipe, wherein the backflow control valve is a ball type backflow control valve, and wherein the check valve is located closer to the compressor body than the backflow control valve;

a first aftercooler disposed between the discharge port of the compressor body and the check valve to cool the compressed medium discharged through the discharge port; and a second aftercooler disposed between a discharge port of the check valve and the backflow control valve.

2. The rotary displacement compressor according to claim 1, wherein the compressor body is a scroll type compressor body including an orbiting scroll and a fixed scroll.

3. The rotary displacement compressor according to claim 2, further comprising:

a PM motor that drives the compressor body; and a control unit that inverter-controls the PM motor.

4. The rotary displacement compressor according to claim 3, wherein the control unit includes a reverse rotation detection unit that detects a rotation of the orbiting scroll.

5. The rotary displacement compressor according to claim 4, wherein the reverse rotation detection unit detects the reverse rotation of the orbiting scroll using current or voltage, and wherein the control unit determines that the check valve has failed when the reverse rotation detection unit detects the reverse rotation.

6. The rotary displacement compressor according to claim 3, wherein the PM motor is an axial gap type rotary motor with a structure in which a rotor and a stator face each other in an axial direction of a shaft.

* * * * *